US012736679B2

(12) United States Patent
Li et al.

(10) Patent No.: US 12,736,679 B2
(45) Date of Patent: Sep. 15, 2026

(54) METHOD FOR PROCESSING THREE-DIMENSIONAL SCANNING DATA, THREE-DIMENSIONAL SCANNING METHOD, AND THREE-DIMENSIONAL SCANNING SYSTEM

(71) Applicant: Shining 3D Tech Co., Ltd., Hangzhou (CN)

(72) Inventors: Zhouqiang Li, Hangzhou (CN); Yuansong Zhang, Hangzhou (CN); Shengguan Quan, Hangzhou (CN); Zhongping Li, Hangzhou (CN); Xiaobo Zhao, Hangzhou (CN)

(73) Assignee: Shining 3D Tech Co., Ltd., Hangzhou (CN)

( * ) Notice: Subject to any disclaimer, the term of this patent is extended or adjusted under 35 U.S.C. 154(b) by 80 days.

(21) Appl. No.: 18/752,835

(22) Filed: Jun. 25, 2024

(65) Prior Publication Data

US 2024/0345249 A1 Oct. 17, 2024

(30) Foreign Application Priority Data

Jan. 25, 2024 (CN) ......................... 202410109933.8

(51) Int. Cl.

| | |
|---|---|
| ***G01S 17/66*** | (2006.01) |
| ***G01S 7/481*** | (2006.01) |
| ***G01S 7/497*** | (2006.01) |
| ***G01S 17/87*** | (2020.01) |

(52) U.S. Cl.

CPC ............ *G01S 17/66* (2013.01); *G01S 7/4817* (2013.01); *G01S 7/4972* (2013.01); *G01S 17/87* (2013.01)

(58) Field of Classification Search

CPC ...... G01S 17/66; G01S 7/4817; G01S 7/4972; G01S 17/87; G01S 17/42; G01B 11/24; G01B 11/002

USPC .......................................................... 356/614

See application file for complete search history.

(56) References Cited

U.S. PATENT DOCUMENTS

2005/0189719 A1* 9/2005 Goldwitz ............. A63B 63/004 273/407

FOREIGN PATENT DOCUMENTS

| | | |
|---|---|---|
| CN | 106959080 | 7/2017 |
| CN | 109000582 | 12/2018 |
| CN | 114877802 | 8/2022 |

* cited by examiner

*Primary Examiner* — Md M Rahman

(74) *Attorney, Agent, or Firm* — ScienBiziP, P.C.

(57) ABSTRACT

A method for processing three-dimensional scanning data is provided. The method includes acquiring a first coordinate set sequence by a target optical tracker measuring a first target ball group when the target optical tracker is at a plurality of different target positions, and a position of the first target ball group remains unchanged. A second coordinate set sequence is obtained by a laser tracker measuring a second target ball group when the target optical tracker is at the plurality of different target positions, a position of the laser tracker remains unchanged, and a relative position of the second target ball group to the target optical tracker remains unchanged. A target transformation matrix between a coordinate system of the target optical tracker and a coordinate system of the laser tracker is determined based on the first coordinate set sequence and the second coordinate set sequence.

18 Claims, 5 Drawing Sheets

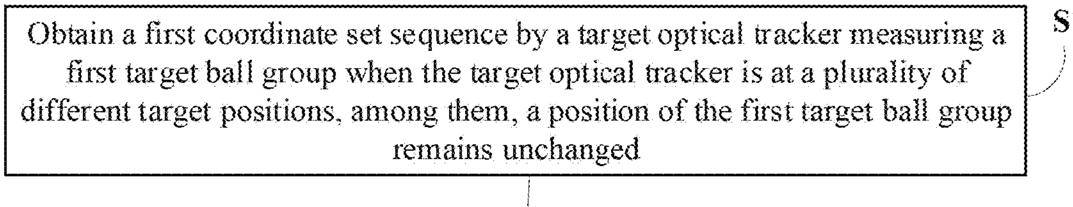

Obtain a second coordinate set sequence by a laser tracker measuring a second target ball group when the target optical tracker is at the plurality of different target positions, among them, a position of the laser tracker remains unchanged, and a relative position of the second target ball group to the target optical tracker remains unchanged

S120

Determine a target transformation matrix between the coordinate system of the target optical tracker and the coordinate system of the laser tracker, based on the first coordinate set sequence and the second coordinate set sequence

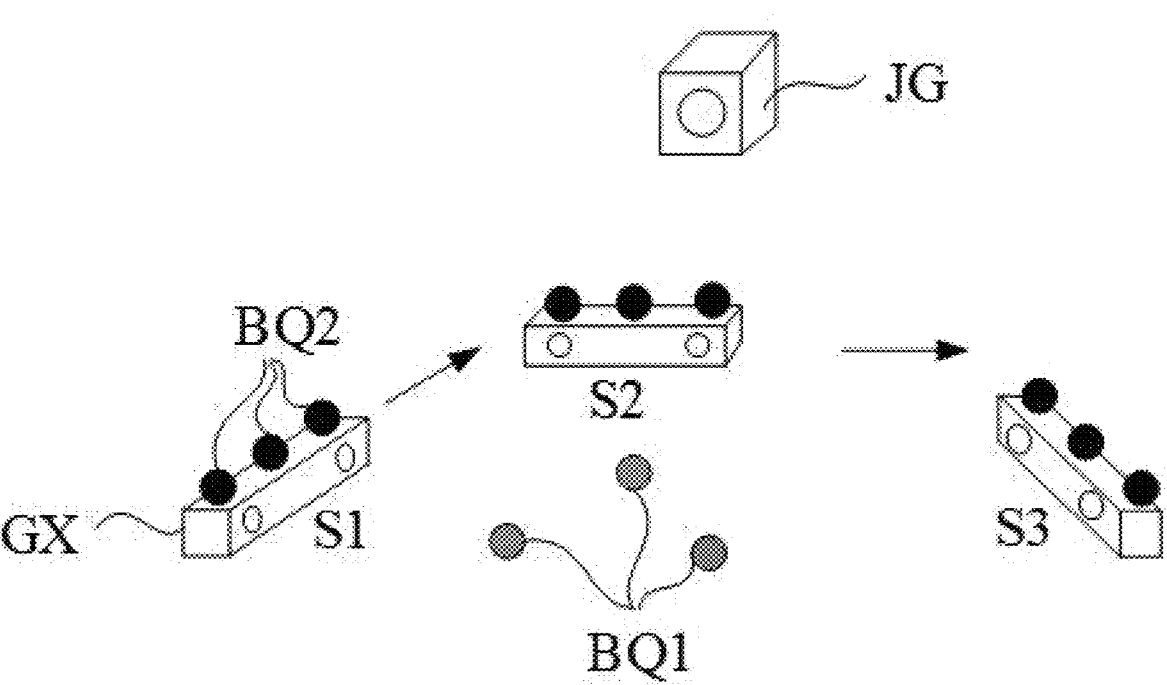

FIG. 2

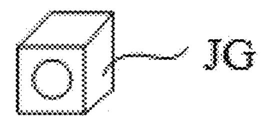

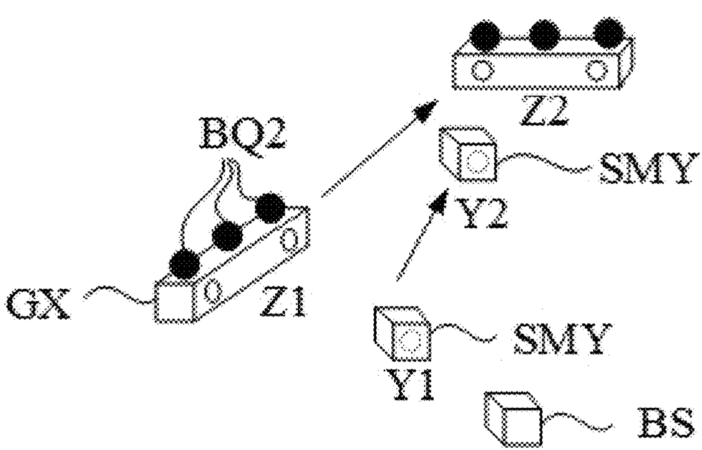

FIG.4

Measure a first target ball group by a target optical tracker to obtain a first coordinate set sequence when the target optical tracker is at a plurality of different target positions, and measure a second target ball group by a laser tracker to obtain a second coordinate set sequence when the target optical tracker is at the plurality of different target positions, among them, a position of the first target ball group remains unchanged, and a relative position of the second target ball group to the target optical tracker remains unchanged — S510

↓

Measure the second target ball group by the laser tracker to obtain a third coordinate set when the target optical tracker is at a position before repositioning, and scan a scanned object by a scanner to obtain first scan data when the target optical tracker is at the position before repositioning — S520

↓

Measure the second target ball group by the laser tracker to obtain a fourth coordinate set when the target optical tracker is at a position after repositioning, and scan the scanned object by the scanner to obtain second scan data when the target optical tracker is at the position after repositioning — S530

FIG. 5

METHOD FOR PROCESSING THREE-DIMENSIONAL SCANNING DATA, THREE-DIMENSIONAL SCANNING METHOD, AND THREE-DIMENSIONAL SCANNING SYSTEM

The present application claims a priority to a Chinese patent application filed with the China National Intellectual Property Administration on Jan. 25, 2024, with an application Ser. No. 202410109933.8 and entitled "METHOD FOR PROCESSING THREE-DIMENSIONAL SCANNING DATA, THREE-DIMENSIONAL SCANNING METHOD, APPARATUS, DEVICE, AND STORAGE MEDIUM", all contents of which are incorporated by reference in the present application.

FIELD

The embodiments of the present disclosure relate to a field of computer technology, and in particular to a method for processing three-dimensional scanning data, a three-dimensional scanning method, and a three-dimensional scanning system.

BACKGROUND

An optical tracker can accurately track and locate a scanner in three dimensions in real time, and is mainly used in three-dimensional scanning of large scenes in industries such as aerospace, automobiles, shipbuilding, and energy. The optical tracker is limited by its principle and has a fixed field of view (i.e., a spatial cone range constraint). If the scanner needs to be tracked and located in a space outside the field of view during use, some public marker points need to be set on or around a scanned object, and coordinates of the public marker points are used to unify a coordinate system of the optical tracker before and after a position of the optical tracker is moved, so as to achieve a repositioning expansion.

However, if the public marker points are displaced relative to the scanned object, or if the public marker points are unreasonably arranged (such as being distributed in a small area in a visual field space), resulting in weak constraints on a spatial position, an accuracy of the repositioning expansion will be reduced. And when a volume of the scanned object is large, the optical tracker needs to move its position multiple times, and then needs the repositioning expansion gradually multiple times, so that errors of the repositioning expansion continue to accumulate. It can be seen that the accuracy of a repositioning expansion based on the public marker points is low. There is currently no effective solution to this problem.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or the technical solutions in the prior art, the drawings required for use in the embodiments or the description of the prior art will be briefly introduced below. Obviously, for ordinary skilled in this art, other drawings can be obtained based on these drawings without paying any creative labor.

FIG. 1 is a flow chart of a method for processing three-dimensional scanning data provided by an embodiment of the present disclosure;

FIG. 2 is a scene diagram for determining a target transformation matrix provided by an embodiment of the present disclosure;

FIG. 4 is a scene diagram of a three-dimensional scanning provided by an embodiment of the present disclosure;

FIG. 5 is a flow chart of a three-dimensional scanning method provided by an embodiment of the present disclosure;

EMBODIMENTS OF THE PRESENT APPLICATION

Figure 3:
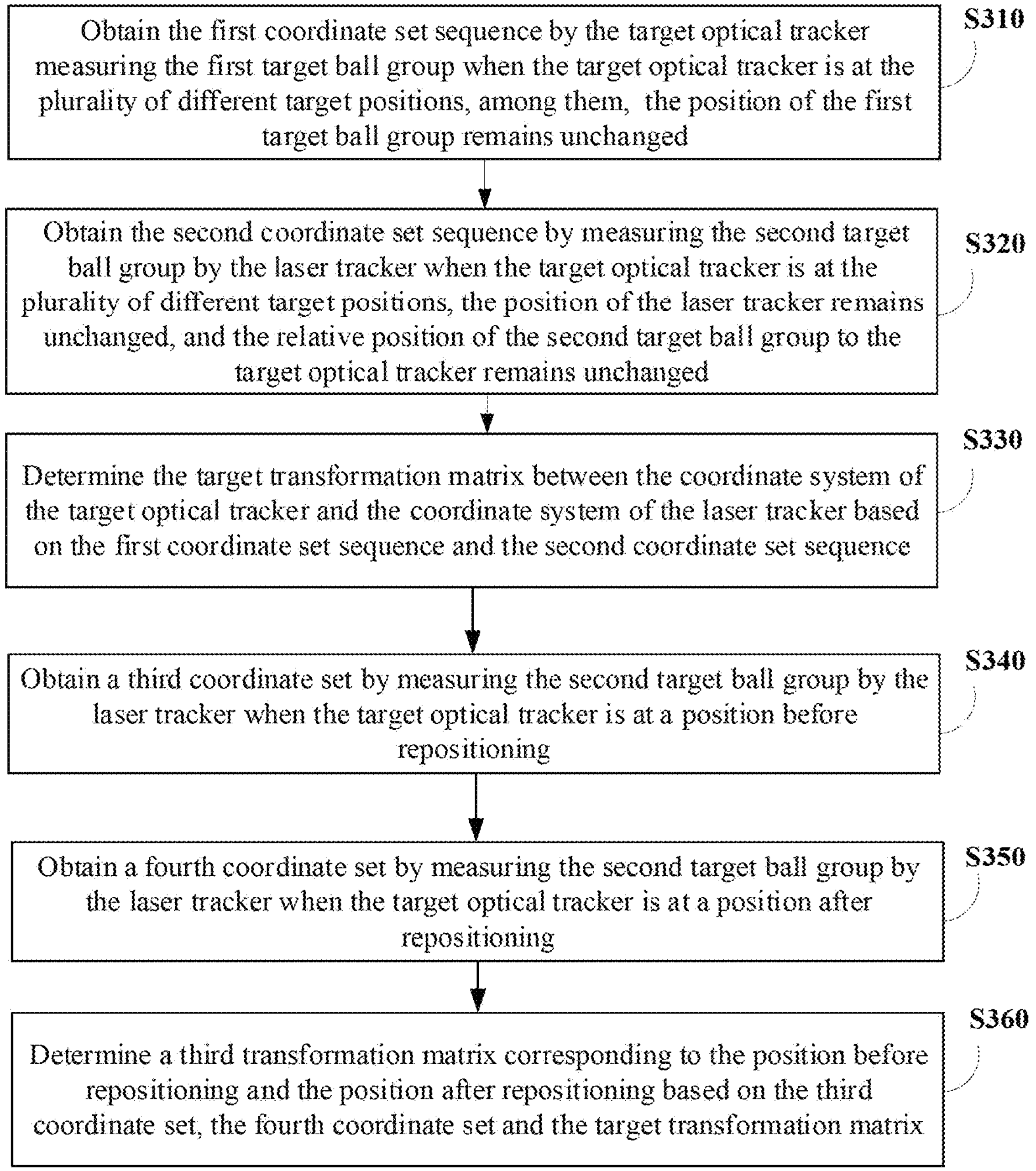
FIG. 3 is a flow chart of another method for processing three-dimensional scanning data provided by an embodiment of the present disclosure.

In order to understand the above objects, features and advantages of the present disclosure more clearly, the solutions of the present disclosure will be further described below. It should be noted that, as long as there is no conflict, the embodiments of the present disclosure and the features in the embodiments can be combined with each other.

In the following description, many specific details are set forth to facilitate a full understanding of the present disclosure, but the present disclosure may also be implemented in other ways different from those described herein; it is obvious that the embodiments in the specification are only part of the embodiments of the present disclosure, rather than all of the embodiments.

FIG. 1 is a flow chart of a method for processing three-dimensional scanning data provided by an embodiment of the present disclosure, and the method can be performed by an electronic device. The electronic device can be exemplarily understood as a device such as an optical tracker, a laser tracker, a scanner, a mobile phone, a tablet computer, a laptop computer, a desktop computer, a smart TV, etc. As shown in FIG. 1, the method provided by this embodiment includes the following steps:

S110, a first coordinate set sequence is obtained by a target optical tracker measuring a first target ball group when the target optical tracker is at a plurality of different target positions, among them, a position of the first target ball group remains unchanged.

S120, a second coordinate set sequence is obtained by a laser tracker measuring a second target ball group when the target optical tracker is at the plurality of different target positions, among them, a position of the laser tracker remains unchanged, and a relative position of the second target ball group to the target optical tracker remains unchanged.

Specifically, the first target ball group includes a plurality of first target balls, and positions of the first target balls relative to a ground remain unchanged.

Optionally, the first target ball group can be set on the ground. Specifically, the first target ball is fixed on the ground by a target seat. In this way, a difficulty of setting the first target ball group can be reduced.

Alternatively, the first target ball group can be placed on another optical tracker of which the position remains unchanged. Specifically, when a three-dimensional scanning is performed on a large-scale scanned object, multiple optical trackers are often required to track and position a scanner. Therefore, the first target balls can be set on an optical tracker except the target optical tracker, of which a position relative to the ground remains unchanged. In this way, after a three-dimensional scan is completed, the first target ball group does not need to be dismantled, and the first target ball group can be used directly during a next three-dimensional scan without reinstallation, which is beneficial to saving labor costs.

Specifically, the second target ball group includes a plurality of second target balls, and positions of the second target balls relative to the target optical tracker remain unchanged.

Optionally, the second target ball group is placed on a top of the target optical tracker. Specifically, the second target balls are evenly distributed on the top of the target optical tracker through a target base. In this way, a risk of the second target ball group being blocked can be reduced, which is conducive to fully exposing the second target ball group in front of the laser tracker, and facilitates the laser tracker to obtain a coordinate of each second target ball in the second target ball group. Moreover, it can better ensure that the second target ball group moves with the target optical tracker, so as to better ensure that the positions of the second target balls relative to the target optical tracker remain unchanged.

In the embodiment of the present disclosure, in order to obtain a target transformation matrix between a coordinate system of the target optical tracker and a coordinate system of the laser tracker, first, the first target ball group and the second target ball group are set. Then, when the position of the laser tracker relative to the ground remains unchanged, the target optical tracker is moved continuously multiple times so that the target optical tracker passes through multiple different target positions in sequence (a number of the target positions is greater than or equal to 3). When the target optical tracker is at each target position, the target optical tracker can measure the first target ball group to obtain the first coordinate set corresponding to the target position, among them, the first coordinate set includes a first coordinate of each first target ball in in the first target ball group. The laser tracker can measure the second target ball group to obtain a second coordinate set corresponding to the target position, among them, the second coordinate set includes a second coordinate of each second target ball in the second target ball group. Multiple first coordinate sets corresponding to multiple different target positions constitute a first coordinate sequence, and multiple second coordinate sets corresponding to multiple different target positions constitute a second coordinate sequence. It should be noted that the electronic device can receive the first coordinate set sequence sent by the target optical tracker, and receive the second coordinate set sequence sent by the laser tracker. Of course, the first coordinate set sequence and the second coordinate set sequence can also be stored in a storage device (such as a USB flash drive). In this case, the electronic device can read the first coordinate set sequence and the second coordinate set sequence from the storage device.

Exemplarily, FIG. 2 is a scene diagram for determining a target transformation matrix provided by an embodiment of the present disclosure. As shown in FIG. 2, first, the first target ball group BQ1 is fixed on the ground, and the second target ball group BQ2 is evenly fixed on the top of the target optical tracker GX. Then, while the position of the laser tracker JG relative to the ground remains unchanged, the target optical tracker GX is moved twice in succession so that the target optical tracker GX passes through three different target positions S1, S2, and S3 in sequence. When the target optical tracker GX is at the target position S1, the target optical tracker GX can measure the first target ball group BQ1 to obtain a first coordinate set P11 corresponding to the target position S1, and the laser tracker JG can measure the second target ball group BQ2 to obtain a second coordinate set P21 corresponding to the target position S1. Similarly, when the target optical tracker GX moves from the target position S1 to the target position S2, the target optical tracker GX can measure the first target ball group BQ1 to obtain the first coordinate set P12 corresponding to the target position S2, and the laser tracker JG can measure the second target ball group BQ2 to obtain the second coordinate set P22 corresponding to the target position S2. Similarly, when the target optical tracker GX moves from the target position S2 to the target position S3, the target optical tracker GX can measure the first target ball group BQ1 to obtain the first coordinate set P13 corresponding to the target position S3, and the laser tracker JG can measure the second target ball group BQ2 to obtain the second coordinate set P23 corresponding to the target position S3. In this way, the electronic device can obtain a first coordinate set sequence including the first coordinate set P11, the first coordinate set P12, and the first coordinate set P13, and can obtain a second coordinate set sequence including the second coordinate set P21, the second coordinate set P22, and the second coordinate set P23.

S130, based on the first coordinate set sequence and the second coordinate set sequence, a target transformation matrix between the coordinate system of the target optical tracker and the coordinate system of the laser tracker is determined.

Among them, the target transformation matrix is used to unify first scan data and second scan data into a same coordinate system. The first scan data is obtained by a scanner scanning the scanned object when the target optical tracker is at a position before a repositioning expansion, the second scanning data is obtained by the scanner scanning the scanned object when the target optical tracker is at a position after the repositioning expansion.

In some embodiments, S130 may include: S131, for two first coordinate sets corresponding to two adjacent target positions in the first coordinate set sequence, determining a first transformation matrix corresponding to the two adjacent target positions based on the two first coordinate sets; S132, for two second coordinate sets corresponding to two adjacent target positions in the second coordinate set sequence, determining a second transformation matrix corresponding to the two adjacent target positions based on the two second coordinate sets; S133, determining the target transformation matrix based on the first transformation matrix and the second transformation matrix.

Specifically, the first transformation matrix corresponding to the two target positions refers to a transformation matrix between an optical tracker coordinate system when the target optical tracker is at one target position and an optical tracker coordinate system when the target optical tracker is at another target position. It can also be said to refer to a position transformation of the first target ball group in the optical tracker coordinate system.

Exemplarily, referring to the previous example, for the first coordinate set sequence including a first coordinate set P11, a first coordinate set P12, and a first coordinate set P13, a first transformation matrix A1 corresponding to a target position S1 and a target position S2 is determined based on the first coordinate set P11 and the first coordinate set P12, and a first transformation matrix A2 corresponding to the target position S2 and a target position S3 is determined based on the first coordinate set P12 and the first coordinate set P13.

Specifically, the second transformation matrix corresponding to the two target positions refers to a transformation matrix when the target optical tracker is moved from one target position to another target position in a laser tracker coordinate system.

Illustratively, continuing to refer to the previous example, for the second coordinate set sequence including a second coordinate set P21, a second coordinate set P22, and a second coordinate set P23, a second transformation matrix B1 corresponding to the target position S1 and the target position S2 is determined based on the second coordinate set P21 and the second coordinate set P22, a second transformation matrix B2 corresponding to the target position S2 and the target position S3 is determined based on the second coordinate set P22 and the second coordinate set P23.

Specifically, the target transformation matrix can be solved based on a hand-eye calibration relationship AX=XB. Among them, A is the first transformation matrix, X is the target transformation matrix, and B is the second transformation matrix.

Illustratively, continue to refer to the previous example, and jointly solve the target transformation matrix based on A1X=XB1 and A2X=XB2.

Of course, in other embodiments, S130 may include: inputting the first coordinate set sequence and the second coordinate set sequence into a first network model that has been pre-trained, and obtaining the target transformation matrix between the coordinate system of the target optical tracker and the coordinate system of the laser tracker output by the first network model.

Embodiments of the present disclosure can use the laser tracker to obtain the second coordinate set sequence with a high accuracy, and then determine the target transformation matrix with a high accuracy between the coordinate system of the target optical tracker and the coordinate system of the laser tracker based on the first coordinate set sequence and the second coordinate set sequence with the high accuracy. In this way, when the target optical tracker moves from one position to another position in order to track the scanner, it does not need to rely on public marker points. Based on the transformation matrix with the high accuracy, the repositioning expansion with a high accuracy can be achieved, which is beneficial to improving the accuracy of the repositioning expansion.

FIG. 3 shows a schematic flowchart of another method for processing three-dimensional scanning data provided by an embodiment of the present disclosure. The embodiments of the present disclosure are optimized based on the above-mentioned embodiments, and the embodiments of the present disclosure can be combined with various optional solutions in one or more of the above-mentioned embodiments.

As shown in FIG. 3, the method for processing three-dimensional scanning data may include the following steps.

S310, the first coordinate set sequence is obtained by measuring the first target ball group by the target optical tracker when the target optical tracker is at the plurality of different target positions, among them, the position of the first target ball group remains unchanged.

Specifically, S310 is similar to S110 and will not be described again here.

S320, the second coordinate set sequence is obtained by measuring the second target ball group by the laser tracker when the target optical tracker is at the plurality of different target positions. The position of the laser tracker remains unchanged, and the relative position of the second target ball group to the target optical tracker remains unchanged.

Specifically, S320 is similar to S120 and will not be described again here.

S330, based on the first coordinate set sequence and the second coordinate set sequence, the target transformation matrix between the coordinate system of the target optical tracker and the coordinate system of the laser tracker is determined.

Specifically, S330 is similar to S130 and will not be described again here.

S340, a third coordinate set is obtained by measuring the second target ball group by the laser tracker when the target optical tracker is at a position before repositioning.

S350, a fourth coordinate set is obtained by measuring the second target ball group by the laser tracker when the target optical tracker is at a position after repositioning.

In the embodiment of the present disclosure, after the target transformation matrix is obtained, first, the position of the laser tracker relative to the ground is not changed, that is, the laser tracker is kept fixed, and the first target ball group is removed. Then, while the laser tracker continues to maintain the same position relative to the ground, when the target optical tracker is at the position before repositioning, the laser tracker can measure coordinates of the second target ball group to obtain the third coordinate set (the third coordinate set includes the third coordinate of each second target ball in the second target ball group). The target optical tracker can track and position the scanner in a field of view when the target optical tracker is at the position before repositioning. The scanner can scan the scanned object three-dimensionally. When the scanner moves out of the field of view, the target optical tracker can move from the position before repositioning to the position after repositioning. When the target optical tracker is at the position after repositioning, the laser tracker can measure coordinates of the second target ball group to obtain the fourth coordinate set (the third coordinate set includes a fourth coordinate of each second target ball in the second target ball group). The target optical tracker can track and position the scanner in a field of view when the target optical tracker is at the position after repositioning. It should be noted that the electronic device can receive the third coordinate set and the fourth coordinate set sent by the laser tracker. Of course, the third coordinate set and the fourth coordinate set can also be stored in a storage device (such as a USB flash drive). At this time, the electronic device can read the third coordinate set and the fourth coordinate set from the storage device.

For example, FIG. 4 is a scene diagram of a three-dimensional scan provided by an embodiment of the present disclosure. As shown in FIG. 2 and FIG. 4, first, the laser tracker JG is kept fixed and the first target ball group BQ1 is removed. Then, when the laser tracker JG continues to maintain its position relative to the ground, and when the target optical tracker GX is at a position Z1 prior to repositioning, the laser tracker JG can measure coordinates of the second target ball group BQ2 to obtain a third coordinate set P3, the target optical tracker GX can track and locate a scanner SMY in the field of view when the target optical tracker GX is at the position before repositioning, and the scanner SMY can perform a three-dimensional scan on a scanned object BS, when the scanner SMY moves from a position Y1 to a position Y2 and moves out of the field of view, the target optical tracker GX can move from the position Z1 prior to repositioning to the position Z2 after repositioning, when the target optical tracker GX is at the position Z2 after repositioning, the laser tracker JG can measure coordinates of the second target ball group BQ2 to obtain the fourth coordinate set P4, the target optical tracker GX can track and locate the scanner SMY in the field of view when the target optical tracker GX is at the position Z2 after repositioning, and the scanner SMY can perform a three-dimensional scan on the scanned object BS. In this way, the electronic device can obtain the third coordinate set P3 and the fourth coordinate set P4.

S360, a third transformation matrix corresponding to the position before repositioning and the position after repositioning is determined based on the third coordinate set, the fourth coordinate set and the target transformation matrix.

Specifically, the third transformation matrix is understood as follows: a transformation matrix between the optical tracker coordinate system when the target optical tracker is at the position before repositioning and the optical tracker coordinate system when the target optical tracker is at the position after repositioning.

In some embodiments, S360 may include: S361, determining a fourth transformation matrix corresponding to the position before repositioning and the position after repositioning based on the third coordinate set and the fourth coordinate set; S362, performing an inverse matrix transformation on the target transformation matrix to obtain a target inverse matrix; S363, determining the third transformation matrix based on the fourth transformation matrix, the target transformation matrix, and the target inverse matrix.

Specifically, the fourth transformation matrix is understood as follows: in the laser tracker coordinate system, it is a transformation matrix when the target optical tracker is moved from the position before repositioning to the position after repositioning.

Exemplarily, referring to the above example, based on the third coordinate set P3 and the fourth coordinate set P4, the fourth transformation matrix T1 corresponding to the position Z1 before repositioning and the position Z2 after repositioning is determined.

Specifically, the third transformation matrix can be solved based on $T2=X-1*T1*X$, where T1 is the fourth transformation matrix, X is the target transformation matrix, X−1 is the target inverse matrix, and T2 is the third transformation matrix.

It can be understood that, based on the third transformation matrix, the positions of the target optical tracker tracking the scanner before and after repositioning can be unified into the same optical tracker coordinate system, thereby achieving the repositioning expansion.

In some embodiments, optionally, the method further includes: S370, acquiring first scanning data obtained by the scanner scanning the scanned object when the target optical tracker is at the position before repositioning; S380, acquiring second scanning data obtained by the scanner scanning the scanned object when the target optical tracker is at the position after repositioning; S390, unifying the first scanning data and the second scanning data into a same coordinate system based on the third transformation matrix.

Specifically, the first scanning data includes image frames obtained by capturing images of the scanned object by the scanner when the target optical tracker is at the position before repositioning.

Specifically, the second scanning data includes image frames obtained by capturing images of the scanned object by the scanner when the target optical tracker is at the position after repositioning.

It can be understood that, as described above, based on the third transformation matrix, the position (i.e., posture) of tracking the scanner by the target optical tracker before and after repositioning can be unified into the same optical tracker coordinate system. In this way, the first scan data and the second scan data can be spliced based on the postures of the scanner in the same optical tracker coordinate system, thereby unifying the first scan data and the second scan data into the same coordinate system.

According to the embodiments of the present disclosure, a high-precision laser tracker can be used to cooperate with the target optical tracker to determine the third transformation matrix corresponding to the target optical tracker before and after repositioning, so as to realize the repositioning expansion, so that the target optical tracker does not need to use markers and has a high accuracy when repositioning, and because the laser tracker has a large measurement range (usually a radius of up to 160 meters), it can meet the needs of multiple continuous repositioning expansions of the target optical tracker, thereby achieving an expansion of a large-scale tracking work area. Furthermore, based on the third transformation matrix, the first scanning data and the second scanning data can be unified into the same coordinate system, thereby achieving a large-scale expansion of a wide range of scanning space.

FIG. 5 is a flow chart of a three-dimensional scanning method provided by an embodiment of the present disclosure, and the three-dimensional scanning method can be performed by an electronic device. The electronic device can be exemplarily understood as a device such as a three-dimensional scanning system. Exemplarily, the three-dimensional scanning system can include a laser tracker, a target optical tracker, and a scanner. As shown in FIG. 5, the method provided by this embodiment includes the following steps:

S510, a first target ball group is measured by a target optical tracker to obtain a first coordinate set sequence when the target optical tracker is at a plurality of different target positions, and a second target ball group is measured by a laser tracker to obtain a second coordinate set sequence when the target optical tracker is at the plurality of different target positions, among them, a position of the first target ball group remains unchanged, and a relative position of the second target ball group to the target optical tracker remains unchanged.

Specifically, for the understanding of S510, please refer to the above explanations about S110 and S120, which will not be repeated here.

S520, the second target ball group is measured by the laser tracker to obtain a third coordinate set when the target optical tracker is at a position before repositioning, and a scanned object is scanned by a scanner to obtain first scan data when the target optical tracker is at the position before repositioning.

Specifically, for the understanding of S520, please refer to the previous explanations of S340 and S370, which will not be described again here.

S530, the second target ball group is measured by the laser tracker to obtain a fourth coordinate set when the target optical tracker is at a position after repositioning, and the scanned object is scanned by the scanner to obtain second scan data when the target optical tracker is at the position after repositioning.

Specifically, for the understanding of S520, please refer to the previous explanations of S350 and S380, which will not be described again here.

The disclosed embodiments can use a high-precision laser tracker in conjunction with a target optical tracker to achieve repositioning expansion, so that the target optical tracker can reposition without the aid of marker points and has a high accuracy. In addition, since the laser tracker has a large measurement range, it can meet the needs of continuous multiple repositioning expansions of the target optical tracker, thereby achieving large-scale three-dimensional scanning.

Figure 6:
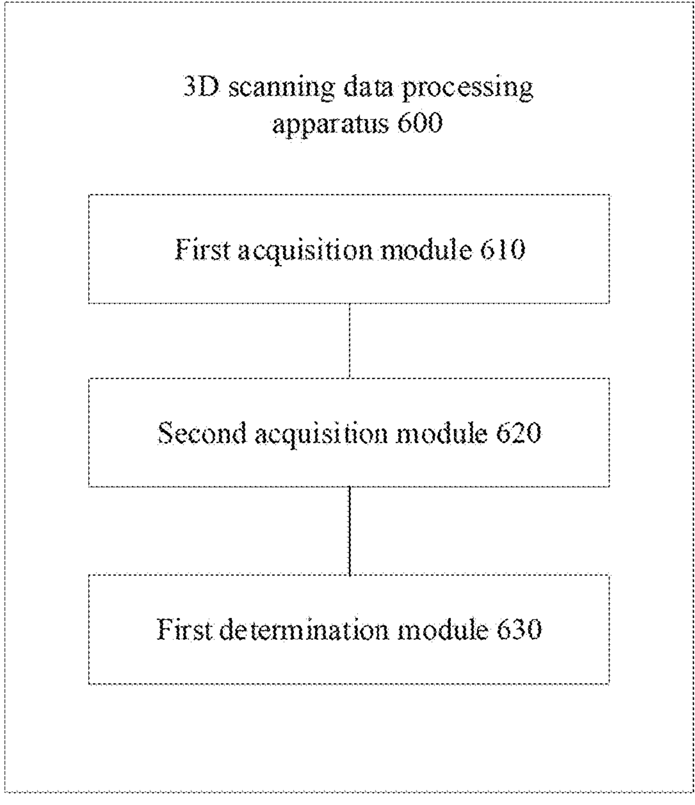
FIG. 6 is a schematic structural diagram of a three-dimensional scanning data processing apparatus provided by an embodiment of the present disclosure.

FIG. 6 is a schematic diagram of a structure of a 3D scanning data processing apparatus provided by an embodiment of the present disclosure, and the 3D scanning data processing apparatus can be understood as the above-mentioned electronic device or a part of functional modules in the above-mentioned electronic device. As shown in FIG. 6, the 3D scanning data processing apparatus 600 includes:

A first acquisition module 610 is used to acquire a first coordinate set sequence obtained by a target optical tracker measuring a first target ball group when the target optical tracker is at a plurality of different target positions, among them, a position of the first target ball group remains unchanged;

The second acquisition module 620 is used to acquire a second coordinate set sequence obtained by a laser tracker measuring a second target ball group when the target optical tracker is at the plurality of different target positions, among them, a position of the laser tracker remains unchanged, and a relative position of the second target ball group to the target optical tracker remains unchanged;

A first determination module 630 is used to determine a target transformation matrix between a coordinate system of the target optical tracker and a coordinate system of the laser tracker based on the first coordinate set sequence and the second coordinate set sequence.

In another embodiment of the present disclosure, the first determination module 630 is specifically configured to: for two first coordinate sets corresponding to two adjacent target positions in the first coordinate set sequence, determine a first transformation matrix corresponding to the two adjacent target positions based on the two first coordinate sets;

For two second coordinate sets corresponding to two adjacent target positions in the second coordinate set sequence, determine a second transformation matrix corresponding to the two adjacent target positions based on the two second coordinate sets;

Determine the target transformation matrix based on the first transformation matrix and the second transformation matrix.

In yet another embodiment of the present disclosure, the apparatus further includes:

A third acquisition module is used to acquire a third coordinate set obtained by the laser tracker measuring the second target ball group when the target optical tracker is at a position before repositioning;

A fourth acquisition module is used to acquire a fourth coordinate set obtained by the laser tracker measuring the second target ball group when the target optical tracker is at a position after repositioning;

A second determination module is used to determine a third transformation matrix corresponding to the position before repositioning and the position after repositioning based on the third coordinate set, the fourth coordinate set and the target transformation matrix.

In yet another embodiment of the present disclosure, the second determination module is specifically configured to determine a fourth transformation matrix corresponding to the position before repositioning and the position after repositioning based on the third coordinate set and the fourth coordinate set;

Perform an inverse matrix transformation on the target transformation matrix to obtain a target inverse matrix;

Determine the third transformation matrix based on the fourth transformation matrix, the target transformation matrix, and the target inverse matrix.

In yet another embodiment of the present disclosure, the apparatus further includes:

A fifth acquisition module is used to acquire first scanning data obtained by a scanner scanning a scanned object when the target optical tracker is at the position before repositioning;

A sixth acquisition module is used to acquire second scanning data obtained by the scanner scanning the scanned object when the target optical tracker is at the position after repositioning;

A unification module is used to unify the first scanning data and the second scanning data into a same coordinate system based on the third transformation matrix.

In yet another embodiment of the present disclosure, the first target ball group is disposed on the ground, or on another optical tracker of which a position remains unchanged.

In yet another embodiment of the present disclosure, the second target ball group is disposed on a top of the target optical tracker.

The apparatus provided in this embodiment can execute the method of any of the above embodiments, and its execution method and beneficial effects are similar, which will not be repeated here.

An embodiment of the present disclosure further provides an electronic device, which includes: a storage device, in which a computer program is stored; and a processor, for executing the computer program. When the computer program is executed by the processor, the method of any of the above embodiments can be implemented.

Figure 7:
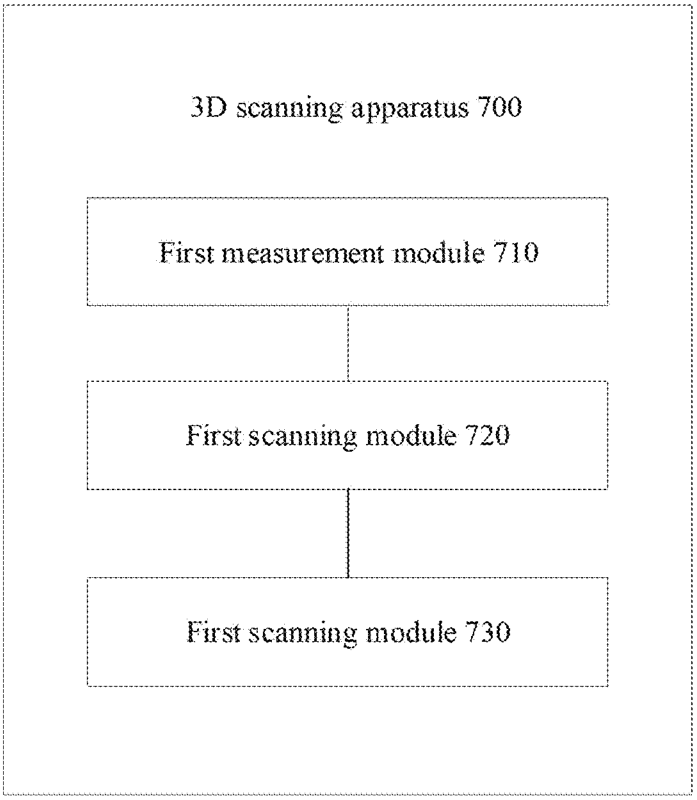
FIG. 7 is a schematic structural diagram of a three-dimensional scanning apparatus provided by an embodiment of the present disclosure.

FIG. 7 is a schematic structural diagram of a three-dimensional scanning apparatus provided by an embodiment of the present disclosure. The three-dimensional scanning data processing apparatus can be understood as the above-mentioned electronic device or some functional modules in the above-mentioned electronic device. As shown in FIG. 7, the three-dimensional scanning data processing apparatus 700 includes:

A first measurement module 710 is used to, under a condition that a position of a laser tracker remains unchanged, measure a first target ball group by a target optical tracker to obtain a first coordinate set sequence when the target optical tracker is at a plurality of different target positions, and measure a second target ball group by the laser tracker to obtain a second coordinate set sequence when the target optical tracker is at the plurality of different target positions, among them, a position of the first target ball group remains unchanged, and a relative position of the second target ball group to the target optical tracker remains unchanged;

A first scanning module 720 is used to measure the second target ball group by the laser tracker to obtain a third coordinate set when the target optical tracker is at a position before repositioning, and scanning a scanned object by a scanner to obtain first scan data when the target optical tracker is at the position before repositioning;

A second scanning module 730 is used to measure the second target ball group by the laser tracker to obtain a fourth coordinate set when the target optical tracker is at a position after repositioning, and scan the scanned object by the scanner to obtain second scan data when the target optical tracker is at the position after repositioning.

Figure 8:
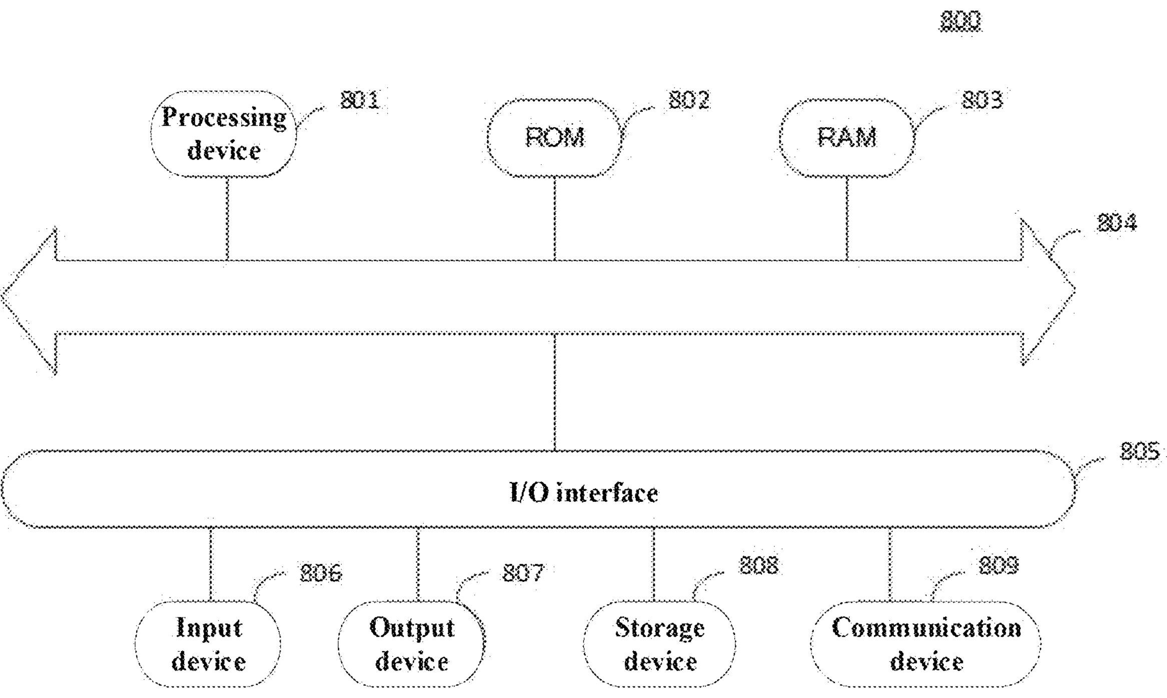
FIG. 8 is a schematic structural diagram of an electronic device in an embodiment of the present disclosure.

For example, FIG. 8 is a schematic diagram of a structure of an electronic device in an embodiment of the present disclosure. Specific reference is made to FIG. 8 below, which shows a schematic diagram of the structure of an electronic device 800 suitable for implementing the embodiment of the present disclosure. The electronic device 800 in the embodiment of the present disclosure may include, but is not limited to, a mobile terminal such as a mobile phone, a laptop computer, a digital broadcast receiver, a PDA (personal digital assistant), a PAD (tablet computer), a PMP (portable multimedia player), a vehicle-mounted terminal (such as a vehicle-mounted navigation terminal), etc., and a fixed terminal such as a digital TV, a desktop computer, etc. The electronic device shown in FIG. 8 is merely an example and should not impose any limitations on the functions and scope of use of the embodiments of the present disclosure.

As shown in FIG. 8, the electronic device 800 may include a processing device (e.g., a central processing unit, a graphics processor, etc.) 801 that can execute various appropriate actions and processes according to a program stored in a read-only memory (ROM) 802 or a program loaded into a random access memory (RAM) 803 from a storage device 808. In the RAM 803, various programs and data required for the operation of the electronic device 800 are also stored. The processing device 801, ROM 802 and RAM 803 are connected to each other via a bus 804. An input/output (I/O) interface 805 is also connected to bus 804.

Typically, following devices may be connected to the I/O interface 805: an input device 806 including, for example, a touch screen, a touchpad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to communicate wirelessly or wired with other devices to exchange data. Although FIG. 8 shows the electronic device 800 with various devices, it should be understood that it is not required to implement or have all the devices shown. More or fewer devices may be implemented or have alternatively.

In particular, according to embodiments of the present disclosure, the processes described above with reference to the flowcharts may be implemented as computer software programs. For example, embodiments of the present disclosure include a computer program product including a computer program carried on a non-transitory computer-readable medium, the computer program includes program codes for performing the method illustrated in the flowchart. In such embodiments, the computer program may be downloaded and installed from the network via the communication device 809, or from the storage device 808, or from the ROM 802. When the computer program is executed by the processing device 801, the above-mentioned functions defined in the method of the embodiment of the present disclosure are performed.

It should be noted that the above storage medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage medium may include, but not limited to: an electrical connection with one or more wires, a portable computer disk, a hard disk, a random-access memory (RAM), a read-only memory (ROM), an erasable programmable read-only memory (EPROM or flash memory), optical fiber, a portable compact disk read-only memory (CD-ROM), an optical storage device, a magnetic storage device, or any suitable combination of the above. In the present disclosure, the computer-readable storage medium may be any tangible medium which contains or stores a program, and the program may be used by or in combination with an instruction execution system, apparatus, or device. In the present disclosure, the computer-readable signal medium may include a data signal propagated in a baseband or as part of a carrier wave, and a computer-readable program code is carried therein. This propagated data signal may be in many forms, including but not limited to an electromagnetic signal, an optical signal, or any suitable combination of the above. The computer-readable signal medium may also be any storage medium other than the computer-readable storage medium, and the computer-readable signal medium may send, propagate, or transmit the program for use by or in combination with the instruction execution system, apparatus, or device. The program code contained on the storage medium may be transmitted by any suitable medium, including, but not limited to: a wire, an optical cable, RF (radio frequency), etc., or any suitable combination of the above.

In some embodiments, the client and the server can communicate by using any currently known or future-developed network protocol, for example, an HTTP (Hyper Text Transfer Protocol), and can be interconnected by a communication network of any form or any medium. Examples of the communication network include a local area network (LAN), a wide area network (WAN), an internet network (for example, the Internet), and an end-to-end network (for example, an ad hoc end-to-end network), and any currently known or future-developed network.

The above computer-readable storage medium may be included in the above electronic device, or may exist alone without being assembled into the electronic device.

The computer-readable medium carries one or more programs. When the one or more programs are executed by the electronic device, the electronic device: obtains a first coordinate set sequence obtained by a target optical tracker measuring a first target ball group when the target optical tracker is at a plurality of different target positions, among them, a position of the first target ball group remains unchanged; obtains a second coordinate set sequence obtained by a laser tracker measuring a second target ball group when the target optical tracker is at the plurality of different target positions, among them, a position of the laser tracker remains unchanged, and a relative position of the second target ball group to the target optical tracker remains unchanged; and determines a target transformation matrix between a coordinate system of the target optical tracker and a coordinate system of the laser tracker based on the first coordinate set sequence and the second coordinate set sequence.

The computer program codes for executing the operations of the present disclosure may be written in one or more programming languages or a combination thereof. The above programming languages include, but not limited to, object-oriented programming languages, such as Java, Smalltalk and C++, and also include conventional procedural programming languages, for example, "C" language or similar programming languages. The program codes may be executed entirely on a user computer, partly on the user computer, as an independent software package, partly on the user computer and partly on a remote computer, or entirely on the remote computer or a server. In the case of the remote computer, the remote computer may be connected to the user computer through any type of network, including the LAN or WAN, or may be connected to an external computer (for example, the Internet connection by an Internet service provider).

The flowcharts and block diagrams in the accompanying drawings of the present disclosure show the possible architecture, functions, and operations of a system, the method, and a computer program product according to various embodiments of the present disclosure. In this regard, each block in the flowcharts or block diagrams can represent a module, a program segment or a part of codes, and the module, the program segment or the part of the codes contains one or more executable instructions for implementing the defined logical functions. It should also be noted that in some implementations as alternatives, the functions labeled in the blocks can occur in an order different from the order labeled in the accompanying drawings. For example, two sequentially shown blocks can be substantially executed in parallel in fact, and they sometimes can also be executed in a reverse order, depending on related functions. It should also be noted that each block in the block diagrams and/or the flowcharts and the combination of the blocks in the block diagrams and/or the flowcharts can be implemented by a dedicated system based on hardware for executing defined functions or operations, or can be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above content.

Embodiments of the present disclosure also provide a computer-readable storage medium. A computer program is stored in the storage medium. When the computer program is executed by a processor, the method of any of the above embodiments can be implemented. Its execution manner and benefits results are similar and will not be repeated here.

It should be noted that, in this article, relational terms such as "first" and "second" are only used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, a method, an article or a device including a series of elements includes not only those elements, but also other elements not explicitly listed, or also includes elements inherent to such process, method, article or device. In an absence of further restrictions, the elements defined by a sentence "comprise a . . . " do not exclude an existence of other identical elements in the process, method, article or device including the elements.

The above description is only a specific embodiment of the present disclosure, so that those skilled in the art can understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A method for processing three-dimensional scanning data, comprising:

acquiring a first coordinate set sequence obtained by a target optical tracker measuring a first target ball group when the target optical tracker is at a plurality of different target positions, a position of the first target ball group remaining unchanged;

acquiring a second coordinate set sequence obtained by a laser tracker measuring a second target ball group when the target optical tracker is at the plurality of different target positions, a position of the laser tracker remaining unchanged, and a relative position of the second target ball group to the target optical tracker remaining unchanged;

determining a target transformation matrix between a coordinate system of the target optical tracker and a coordinate system of the laser tracker based on the first coordinate set sequence and the second coordinate set sequence.

2. The method of claim 1, wherein determining the target transformation matrix between the coordinate system of the target optical tracker and the coordinate system of the laser tracker based on the first coordinate set sequence and the second coordinate set sequence, comprises:

for two first coordinate sets corresponding to two adjacent target positions in the first coordinate set sequence, determining a first transformation matrix corresponding to the two adjacent target positions based on the two first coordinate sets;

for two second coordinate sets corresponding to two adjacent target positions in the second coordinate set sequence, determining a second transformation matrix corresponding to the two adjacent target positions based on the two second coordinate sets;

determining the target transformation matrix based on the first transformation matrix and the second transformation matrix.

3. The method according to claim 1, further comprising:

acquiring a third coordinate set obtained by the laser tracker measuring the second target ball group when the target optical tracker is at a position before repositioning;

acquiring a fourth coordinate set obtained by the laser tracker measuring the second target ball group when the target optical tracker is at a position after repositioning;

determining a third transformation matrix corresponding to the position before repositioning and the position after repositioning based on the third coordinate set, the fourth coordinate set and the target transformation matrix.

4. The method according to claim 3, wherein determining the third transformation matrix corresponding to the position before repositioning and the position after repositioning based on the third coordinate set, the fourth coordinate set and the target transformation matrix, comprises:

determining a fourth transformation matrix corresponding to the position before repositioning and the position after repositioning based on the third coordinate set and the fourth coordinate set;

obtaining a target inverse matrix by performing an inverse matrix transformation on the target transformation matrix;

determining the third transformation matrix based on the fourth transformation matrix, the target transformation matrix, and the target inverse matrix.

5. The method according to claim 3, further comprising:

acquiring first scanning data obtained by a scanner scanning a scanned object when the target optical tracker is at the position before repositioning;

acquiring second scanning data obtained by the scanner scanning the scanned object when the target optical tracker is at the position after repositioning;

unifying the first scanning data and the second scanning data into a same coordinate system based on the third transformation matrix.

6. The method according to claim 1, wherein the first target ball group is disposed on the ground, or on another optical tracker of which a position remains unchanged; and/or;

the second target ball group is disposed on a top of the target optical tracker.

7. The method according to claim 1, wherein the first target ball group comprises a plurality of first target balls, and the second target ball group comprises a plurality of second target balls.

8. The method according to claim 7, wherein each of the plurality of first target balls is fixed on the ground.

9. The method according to claim 7, wherein the plurality of second target balls are evenly distributed on a top of the target optical tracker.

10. A three-dimensional scanning system, comprising:

a laser tracker, a target optical tracker, a first target ball group, and a second target ball group, wherein the target optical tracker measures the first target ball group to acquire a first coordinate set sequence when the target optical tracker is at a plurality of different target positions, a position of the first target ball group remains unchanged, and a relative position of the second target ball group to the target optical tracker remains unchanged;

wherein the laser tracker measures the second target ball group to obtain a second coordinate set sequence when the target optical tracker is at the plurality of different target positions, a position of the laser tracker remains unchanged, and a relative position of the second target ball group to the target optical tracker remains unchanged;

wherein the first coordinate set sequence and the second coordinate set sequence are used for determining a target transformation matrix between a coordinate system of the target optical tracker and a coordinate system of the laser tracker.

11. The three-dimensional scanning system according to claim 10, further comprising a scanner.

12. The three-dimensional scanning system according to claim 10, wherein the system is configured to determine the target transformation matrix by:

for two first coordinate sets corresponding to two adjacent target positions in the first coordinate set sequence, determining a first transformation matrix corresponding to the two adjacent target positions based on the two first coordinate sets;

for two second coordinate sets corresponding to two adjacent target positions in the second coordinate set sequence, determining a second transformation matrix corresponding to the two adjacent target positions based on the two second coordinate sets;

determining the target transformation matrix based on the first transformation matrix and the second transformation matrix.

13. The three-dimensional scanning system according to claim 10, wherein the system is further configured to:

acquire a third coordinate set obtained by the laser tracker measuring the second target ball group when the target optical tracker is at a position before repositioning;

acquire a fourth coordinate set obtained by the laser tracker measuring the second target ball group when the target optical tracker is at a position after repositioning; and determine a third transformation matrix corresponding to the position before repositioning and the position after repositioning based on the third coordinate set, the fourth coordinate set and the target transformation matrix.

14. The three-dimensional scanning system according to claim 13, wherein the system is configured to determine the third transformation matrix by:

determining a fourth transformation matrix corresponding to the position before repositioning and the position after repositioning based on the third coordinate set and the fourth coordinate set;

obtaining a target inverse matrix by performing an inverse matrix transformation on the target transformation matrix; and determining the third transformation matrix based on the fourth transformation matrix, the target transformation matrix, and the target inverse matrix.

15. The three-dimensional scanning system according to claim 13, wherein the system is further configured to:

acquire first scanning data obtained by a scanner scanning a scanned object when the target optical tracker is at the position before repositioning;

acquire second scanning data obtained by the scanner scanning the scanned object when the target optical tracker is at the position after repositioning; and unify the first scanning data and the second scanning data into a same coordinate system based on the third transformation matrix.

16. The three-dimensional scanning system according to claim 10, wherein the first target ball group comprises a plurality of first target balls, and the second target ball group comprises a plurality of second target balls.

17. The three-dimensional scanning system according to claim 16, wherein each of the plurality of first target balls is fixed on the ground.

18. The three-dimensional scanning system according to claim 16, wherein the plurality of second target balls are evenly distributed on a top of the target optical tracker.

* * * * *